June 5, 1928.
S. S. BARKER ET AL
1,672,555
SEMISCALDING TANK FOR FOWLS
Filed Nov. 14, 1927
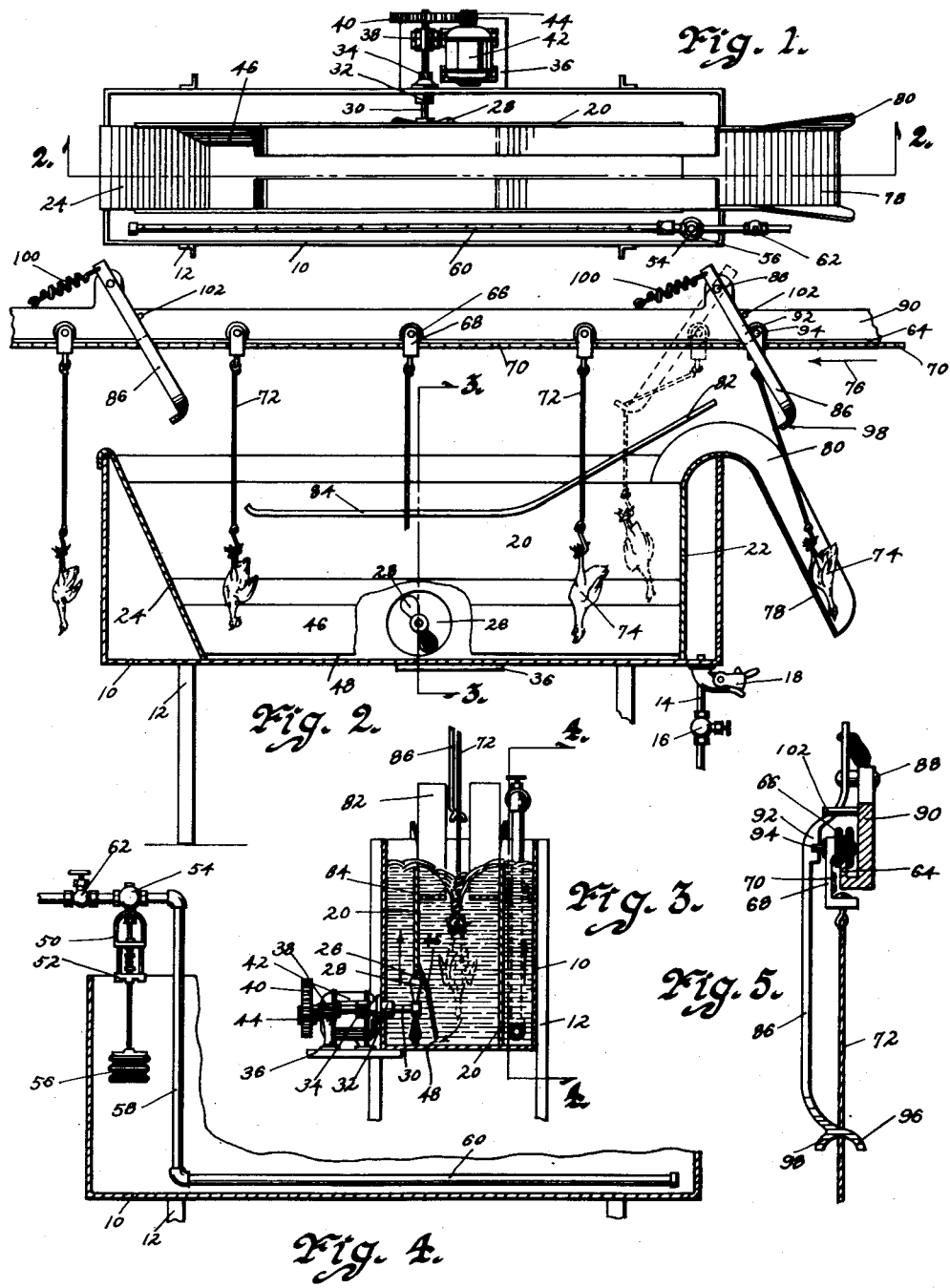
Witness
C. J. Dykstra
Inventors
Seth S. Barker & Albert W. Bruce
by Bair & Freeman Attorneys Patented June 5, 1928.

1,672,555

UNITED STATES PATENT OFFICE.

SETH S. BARKER AND ALBERT W. BRUCE, OF OTTUMWA, IOWA.

SEMISCALDING TANK FOR FOWLS.

Application filed November 14, 1927. Serial No. 233,106.

The object of our invention is to provide a tank structure for semi-scalding fowls before they are picked, the tank itself being of simple, durable, and comparatively inexpensive construction.

A further object is to provide in a tank of this kind efficient means for circulating the water used for semi-scalding the fowls as they are dipped into the tank whereby the temperature throughout is maintained evenly and the circulation also aids in causing the water to penetrate through the feathers of the fowls to their skins whereby the fowls are easier to pick after they have been conducted through the tank.

More particularly it is our object to provide a circulation of water in the tank which will effectively submerge the fowl and prevent its floating on top of the water.

Still a further object is to provide conveyor means mounted above the tank from which the fowls are suspended after they have been killed and which serves to conduct them from one end of the tank to the other so that they will be in the water of the tank a predetermined length of time.

Still a further object is to provide a means for quickly plunging the fowls into the water of the tank and for quickly removing them from the water to insure best results.

Still a further object is to provide means mounted on the tank for maintaining the water therein at a predetermined temperature.

Although the invention is susceptible of a variety of embodiments, it is unnecessary to fully describe and illustrate more than one in order to give a full understanding of the invention both from its structural and functional standpoints.

With these and other objects in view, our invention consists in the construction, arrangement and combination of the various parts of our device, whereby the objects contemplated are attained as hereinafter more fully set forth, pointed out in our claims, and illustrated in the accompanying drawings, in which:

Figure 1 is a plan view of our semi-scalding tank structure.

Figure 2 is a longitudinal sectional view thereof on the line 2—2 of Figure 1.

Figure 3 is a transverse sectional view taken on the line 3—3 of Figure 2.

Figure 4 is a longitudinal sectional view taken on the line 4—4 of Figure 3 illustrating one means for maintaining the water in the tank at a predetermined temperature; and Figure 5 is an enlarged detail sectional view taken on the line 5—5 of Figure 2 illustrating the means for quickly withdrawing a fowl from the tank.

In the poultry industry there are three methods of preparing fowls to be picked.

First is the scald method whereby boiling water is used into which the fowls are dipped a predetermined length of time. This method brings the fowl to a good condition for picking but it has drawbacks. The main drawback is that the boiling water tends to partially cook the skin of the fowl so that after they are picked they do not present quite as good an appearance in the show case and they are not in the best of condition for cold storage. As a result of this, many fowls which might have been termed as No. 1, must be set back into a No. 2 class.

A second method is the dry pick. When this method is used, the fowls are in excellent condition for display and for eating but the feathers are very difficult to pick from them.

A third method has been extensively used and has proven the best. This is the semi-scald method in which a tank is utilized having water in it at about one hundred and thirty degrees Fahrenheit. By the semi-scald method, the fowls can be picked quicker than by the dry pick method and there is no tendency to cook the skin of the fowl as in the scald method. However, certain disadvantages have been found in that the water does not evenly penetrate to the skin of the fowl unless they are dipped in the water and left there longer than is best to obtain satisfactory results and the fowls after having been killed tend to float on the water instead of being submerged. However a greater percentage of No. 1 fowls come from the pickers by the semi-scald method. The fowls also look better in the show case as the semi-scald method enables the pickers to pick all the small hairs from the fowl which are hard to get by the dry pick and scald methods. Fowls which have been semi-scalded go through cold storage in excellent shape.

To overcome the tendency for the fowls to float, weights have been used but this involves additional expense and bother as the weights must be attached to the fowls by hand as they enter the tank and the weights must be removed after the fowls leave the tank.

In our improved semi-scald tank we have endeavored to overcome the objections found in most tanks of this character. We have found after considerable experimenting that a certain type of circulation of the water will produce excellent results not attainable by other tanks in which no circulation is provided.

Our structure comprises a tank 10 which may be supported by suitable legs 12. The tank 10 is rectangular in shape and designed to have the fowls enter it at one end and leave from the other. The tank 10 may for convenience be provided with a water inlet pipe 14 and a valve 16 is provided for controlling the flow of water into the tank 10 through the pipe 14. A drain valve 18 is also provided so that the tank can be drained and cleaned when desired. Spaced from the sides of the tank 10 and within the tank is a pair of circulation walls 20 the tops of which are lower than the top of the tank 10. Spaced from the ends of the tank 10 and within it are end walls 22 and 24. The walls 20 extend from the wall 22 to the wall 24 and the walls 22 and 24 extend between the walls 20. Each of the four walls is soldered or otherwise secured to the bottom of the tank 10 or may be provided with a separate bottom.

From the foregoing description it will be obvious that we provide in effect a tank consisting of the walls 20, 22, and 24 within the tank 10.

In one of the walls 20 is formed an opening 26. Mounted in the opening 26 is a propeller blade 28. The blade 28 is secured to a shaft 30 extending through a bearing flange 32 which may be secured to the side of the tank 10. The bearing flange 32 is provided with a stuffing box 34 from which the shaft 30 projects.

A bracket 36 is secured to the tank 10 and is provided with a bearing 38 adapted to have the end of the shaft 30 journaled in it. A gear 40 is secured to the free end of the shaft 30.

A motor 42 of any suitable design may be secured to the bracket 36 and is provided with a pinion 44 adapted to mesh with the gear 40.

From the construction of the parts just described it will be obvious that rotation of the propeller 28 when there is water in the tank 10 as illustrated in Figure 3 will force this water through the opening 26.

The propeller 28 is made to rotate in the proper direction for drawing water from between the walls 20 and discharging it outside of them. The water when so discharged rises around the outside of the walls 20, 22, and 24 and then flows over the walls 20 and down into the compartment formed between them. This compartment for convenience may be termed an inner tank.

For evenly distributing the flow of water from the inner tank to the opening 26 so that it may be acted upon by the propeller 28 we provide a baffle wall 46. The baffle wall 46 extends along the wall 20 having the opening 26 therein from the wall 22 to the wall 24. The lower edge of the baffle wall 46 is spaced slightly above the bottom of the tank 10 leaving a split opening 48 through which the water from the inner tank is drawn in behind the baffle wall.

Supported within the tank 10 is an automatically regulated valve structure 50. The valve structure 50 may be secured to a bracket 52 extending from a side wall of the tank 10. The valve structure 50 is designed to control the flow of steam through a shut-off valve 54 and has a bellows type diaphragm 56 extending down into the water of the tank to be acted upon by the temperature of the water and thereby controlling the action of the shutoff valve 54. The valve 54 controls the flow of steam through a pipe 58 extending down into the tank 10 and connected to a distributing pipe 60. The distributing pipe 60 consists merely of a pipe having a series of perforations in it from which the steam escapes for heating the water in the tank. A manually controlled shutoff valve 62 may be provided for the purpose of shutting off the steam when the tank is not in operation.

We have found it desirable although not necessary to provide a conveyor track 64 above the tank 10. The conveyor track 64 is designed to have a series of pulleys 66 travelling on it. The pulleys 66 are journaled on brackets 68 and the brackets 68 are connected by a chain 70. The chain 70 may be driven by a suitable motor with a suitable reduction gearing device and it is not deemed necessary to here describe such a device in detail.

The brackets 68 are provided with flexible cords or cables 72 extending downwardly from them which are designed to support fowls 74 on their lower ends. The fowls 74 are suspended by a suitable hook device in inverted position and are adapted to be drawn from end to end of the tank 10 in the direction of the arrow 76. A chute 78 having sides 80 is provided at the forward end of the tank 10 to guide the fowls 74 upwardly and over the forward edge of the tank 10 and into the inner tank between the walls 20. The chute 78 may be a continuation of the wall 22 so that the fowls may easily slide up the chute and over the wall 22.

The wall 24 is made slanting and extends over the rear end wall of the tank 10 so that the fowls in striking the wall 24 will be drawn up it and discharged over the rear end of the tank. To prevent the fowls from floating on the water in the inner tank a pair of slanting guide members 82 are provided which terminate in horizontal guide members 84. This construction leaves a slot 86 through which the cables 72 may be drawn but the fowls 74 will be guided by the guide members 82 and 84 to stay submerged in the water of the inner tank.

To assist the fowls 74 to enter and leave the tank 10 quickly we provide arms 86 pivoted on pins 88 extending from the supporting frame 90 of the conveyor track 64. The arms 86 are provided with projections 92 which coact with pins 94 extending from the brackets 68. The lower ends of the arms 86 are provided with angular projections 96 having extensions 98 for forming a hook to engage the cables or cords 72.

*Practical operation.*

In the operation of our tank the valve 16 is manipulated for filling the tank with water about level with the tops of the walls 20. The steam valve 62 is then opened for admitting steam to the distributing pipe 60 so that this steam will be expelled into the water for heating it. The valve structure 50 is set for a predetermined temperature and when the water reaches this temperature the valve 54 will automatically shut off the steam. Thereafter the water will be maintained at an even temperature due to the automatic operation of the bellows 56.

In the meantime the motor 42 has been started for rotating the propeller blade 28 which causes the water to circulate as indicated by the arrows in Figure 3 of the drawings. The water circulates up the inside of the side walls of the tank 10 and falls over the walls 20 into the compartment between them. This circulation causes the body of water to be evenly heated throughout which is very desirable to obtain the best results from the tank.

The fowls 74 are attached to the cords 72 and killed before they are conveyed to the tank 10. Upon reaching the chute 78 they are dragged upwardly and the cords 72 slid over the angular extension 96 on the first arm 86. After so sliding past the arm 86 the pin 94 on the adjacent bracket 68 engages the extension 92 of the arm causing the cord 72 to be engaged in the hook portion formed by the extensions 96 and 98 on the lower end of the arm. Due to the short distance between the extension 92 and the pivot pin 88, the pin 94 on the bracket 68 causes the arm 86 to swing quickly for giving the fowl a final jerk which causes it to quickly drop into the water in the inner tank. Due to the upward swinging of the extension 92 the pin 94 disengages the extension after the fowl has been dropped into the water and a spring 100 returns the arm 86 to normal position against a stop 102. The fowls are conducted from one end of the tank 10 to the other and then drawn up the wall 24. The second arm 86 operates in a similar manner for quickly withdrawing the fowl from the tank as illustrated in dotted lines in Figure 2. The means for quickly inserting the fowl in the water and withdrawing it therefrom insures accuracy in the time predetermined for the fowl to be in the water.

A very essential result is attained by the circulation of the water in the manner shown and described. The fowls are positioned between the walls 20 in inverted position so that the water falling over the walls 20 onto the fowls will tend to effectively submerge them and will readily enter between the feathers and penetrate quickly to the skin of the fowl. The circulation also insures an even temperature throughout the body of water.

The temperature of the water may be varied for different fowls such as chickens, geese, ducks, etc., in order to obtain best results from the tank. The length of time for the fowls to be in the water may also be varied according to requirements by providing for variation in the speed of the chain 70.

Although we have shown one type of tank in which our invention is embodied, it is to be understood that various changes such as different conveying systems, different arrangements of circulation walls, etc., may be made without departing from the real spirit and purpose of my invention. Also other means may be provded for quickly inserting and withdrawing the fowls from the water and other suitable means such as heating coils for containing steam or hot water may be substituted for the perforated distributing pipe 60. It is therefore our purpose to cover by our claims any modified forms of structure or mechanical equivalents which may be reasonably included within their scope.

We claim as our invention:

1. A semi-scalding tank for fowls comprising a tank proper having water therein, means for conveying fowls from end to end of said tank, guiding means for keeping said fowls at the center of said tank, and means for circulating the water up the sides of said tank and down onto said fowls and thereby keeping them submerged.

2. A semi-scalding tank for fowls comprising a tank proper having water therein, automatically regulated means for keeping said water at a predetermined temperature, means for conveying fowls along the center and from end to end of said tank, and means for circulating the water up the sides of said tank and down onto said fowls.

3. A semi-scalding tank for fowls comprising a tank proper having water therein, means for conveying fowls along the center and from end to end of said tank, and means for circulating the water up the sides of said tank and down onto said fowls and thereby submerging them.

4. A device of the character described comprising a tank, circulating walls therein spaced from the walls of the tank and means for conducting water from the space between the circulating walls to the space between the circulating walls and the tank walls, the circulating walls terminating lower than the top of said tank whereby the water in the space between the circulating walls and the tank walls will fall over the top edges of the circulating walls.

5. A device of the character described comprising a tank, circulating walls therein spaced from the walls of the tank and terminating lower than the top of said tank, means for conducting water from the space between the circulating walls to the space between the circulating walls and the tank walls, conveyor means mounted above said tank for suspending fowls therein and a chute at one end of said tank for conducting the fowls into the space between the circulating walls.

6. A device of the character described comprising a tank, circulating walls therein spaced from the walls of the tank and terminating lower than the top of said tank, means for conducting water from the space between the circulating walls to the space between the circulating walls and the tank walls, conveyor means mounted above said tank for suspending fowls therein, a chute at one end of said tank for conducting the fowls into the space between the circulating walls and means operatively connected to said conveyor for quickly withdrawing the fowls from the tank.

7. A device of the character described comprising a tank, circulating walls therein spaced from the walls of the tank and terminating lower than the top of said tank, means for conducting water from the space between the circulating walls to the space between the circulating walls and the tank walls, conveyor means mounted above said tank for suspending fowls therein, a chute device at each end of said tank for conducting the fowls into and out of said tank and means for causing the fowls to be quickly conducted over said chute devices.

8. In a tank of the character described, an outer tank, an inner tank within the outer tank, an opening in said inner tank adjacent the bottom thereof, means for forcing water through said opening whereby it will flow up the outside thereof and fall over the wall of the inner tank, means for conveying fowls through said inner tank from end to end thereof and guide means in said tank to insure submersion of said fowls in the water.

9. In a semi-scalding tank, an outer tank, an inner tank, means for circulating water from the bottom of the inner tank to the outer tank and from the outer tank over the top of the inner tank, a conveyor above said tank, means for suspending fowls from said conveyor whereby said fowls will be drawn from end to end of the inner tank and means operated by said conveyor for quickly bringing said fowls into and out of said tank.

10. In a semi-scalding tank, an outer tank, an inner tank, means for circulating water from the bottom of the inner tank to the outer tank and from the outer tank over the top of the inner tank, automatically regulated means within said tanks to maintain the water therein at a predetermined temperature, a conveyor above said tank, means for suspending fowls from said conveyor whereby said fowls will be drawn from end to end of the inner tank and means operated by said conveyor for quickly bringing said fowls into and out of said tank.

11. In a semi-scalding tank, an outer tank, an inner tank, means for circulating water from the bottom of the inner tank to the outer tank and from the outer tank over the top of the inner tank, a chute at each end of said semi-scalding tank, a conveyor above said tank, means for suspending fowls from said conveyor whereby said fowls will be drawn up one chute, into and through said inner tank and then up the other chute and out of said inner tank, the circulating water in the device tending to keep the fowls submerged and penetrating through the feathers and to the skin of the fowl and automatically regulated means within said tanks to maintain the water therein at a predetermined temperature.

Des Moines, Iowa, October 29, 1927.

SETH S. BARKER.
ALBERT W. BRUCE.